Jan. 27, 1970 M. KAPILOW 3,492,069
SLIDE PROJECTOR

Filed March 23, 1967 4 Sheets-Sheet 1

INVENTOR
MARVIN KAPILOW
BY
Kane, Dalsimer, Kane, Sullivan & Smith
ATTORNEYS

Jan. 27, 1970   M. KAPILOW   3,492,069
SLIDE PROJECTOR

Filed March 23, 1967   4 Sheets-Sheet 3

INVENTOR
MARVIN KAPILOW
BY
ATTORNEYS

Jan. 27, 1970    M. KAPILOW    3,492,069
SLIDE PROJECTOR

Filed March 23, 1967    4 Sheets-Sheet 4

INVENTOR
MARVIN KAPILOW
BY
Kane, Dalsimer, Kane, Sullivan & Smith
ATTORNEYS

3,492,069
SLIDE PROJECTOR
Marvin Kapilow, 8 Sound Road, Rye, N.Y. 10580
Filed Mar. 23, 1967, Ser. No. 625,530
Int. Cl. G03b 21/18, 21/26
U.S. Cl. 353—55       5 Claims

ABSTRACT OF THE DISCLOSURE

A compact and portable slide projector comprising a housing having a housing cover and a housing base baffled at the rear portions thereof to facilitate ventilation of the housing. The housing base has a hole in the rear bottom portion thereof to allow removal and replacement of a lamp which is mounted in the rear portion of the housing. A heat-absorbing heat-dissipating ventilating shield encloses the lamp and has a light-transmitting opening in the forward portion to allow light from the lamp to pass therethrough. The projector further comprises a lens system having a pair of bi-convex rectangular condenser lenses and a projector lens assembly. Mounted within the lens assembly is a meniscus lens to increase power and reduce distortion and a plano-convex lens behind the meniscus lens with its plane surface forward. Integrally formed with the lens assembly is a handle which is seated in a diagonal guide slot along the side of the housing to enable focusing of the projector.

CROSS REFERENCES TO RELATED APPLICATIONS

The embodiment of my slide projector invention disclosed in the present application may be conveniently used with a multiple slide cartridge in which multiple slides may be mounted for use in conjunction with the slide projector. Such a slide cartridge forms the subject matter disclosed in my companion patent application filed on even date herewith and entitled "Slide Cartridge."

BACKGROUND OF THE INVENTION

This invention relates to a new and improved compact and portable slide projector which may be hand held and operated or operated as a table model or on a tripod.

DESCRIPTION OF THE PRIOR ART

The development of successful compact and portable slide projectors has been retarded by problems encountered in the assembly of the slide projector elements within a small space. Thus, sufficient light output may not be obtained from a smaller bulb and, the heat generated by a bulb within a small enclosed space may have a destructive effect upon the slide projector housing and the lens system. Furthermore, in reduced space, the lens system may not provide a sufficient range or strength of amplification, nor make optimum use of the light produced within the miniaturized space.

SUMMARY OF THE INVENTION

It is an object of this invention to provide a new and improved compact slide projector in which the elements of the projector are assembled within a reduced space and in which a heat shielding of novel arrangement is provided for the projector lamp to absorb and distribute heat generated by the lamp and ventilate the lamp to thereby prevent concentration of heat and protect the projector housing and lens system from damage.

Another object of the invention is to provide a novel lens system within a reduced space which provides a wide range of amplification and makes optimum use of the light and space available within a compact projector.

Yet another object of the invention is to provide a reflector system to thereby make optimum use of the light generated by the lamp in a compact projector.

A further object of the invention is to provide a compact projector which may be easily manufactured from a small number of simple parts and a housing to enclose the projector elements which may be molded in a few number of pieces from synthetic material to provide a slide projector which may be hand held and operated or operated as a desk model.

A still further object is to provide a projector of the above type in which individual slides may be loaded for viewing and removed from the projector merely by pushing out the individual slide with another slide thereby eliminating projection of bright spots.

In order to accomplish these results, my invention contemplates a suitable slide projector housing, lamp and lens system wherein the projector lamp is enclosed within a heat-absorbing, heat-dissipating metal shield provided with baffles to thereby absorb heat generated by the lamp and ventilate the lamp. A hole is provided in the heat shielding enclosing the projector lamp through which the light is projected and to protect the lens system and projector housing from damage. The lens system permits use of a compact slide projector of reduced volume, and includes a pair of stationary rectangular condenser lenses which extend to the four walls of the projector housing and a movable projector lens assembly comprising a slidable barrel enclosing one plano-convex lens. A reflector is secured within the heat shield in juxtaposition with the hole in the heat shield and the lens system to provide optimum use of the light generated by the projector lamp.

DESCRIPTION OF THE PREFERRED EMBODIMENTS

Figure 1:
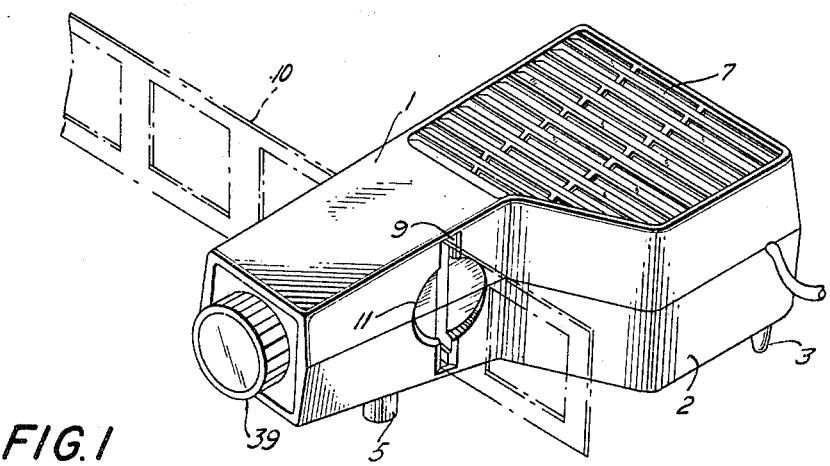
FIG. 1 is an elevated perspective view of an assembled slide projector embodying my invention shown in use with a slide cartridge illustrated in phantom.

In the embodied form of my invention illustrated in FIGS. 1 through 6, there is provided a slide projector housing comprising a housing cover 1 and a housing base 2 to which are secured support legs 3, 4 and 5 provided with rubber, plastic or felt tips designed to prevent projector from slipping on the selected supporting surface. Support leg 5 is secured to a screw in threaded engagement with the slide projector housing so that when the projector is resting on a flat surface, the projector may be raised or lowered by adjusting the screw. With the adjusting screw removed, the housing may be secured to a tripod of variable height through the threaded portion in the housing base. The housing cover and base include baffle elements 7 and 8, respectively, in the vicinity of the projector lamp to facilitate ventilation.

Along the sides of the forward portion of the slide projector housing, indented slits 9 are provided through which individual slides or slides mounted in a cartridge may be fed into the projector. Such a cartridge 10 is illustrated in phantom in FIG. 1 and forms the subject matter of my above mentioned companion application. Adjacent the indented slits 9, indentations 11 are provided in order to facilitate grasping the slides or slide cartridge when they are fed into an out of the projector.

Figure 2:
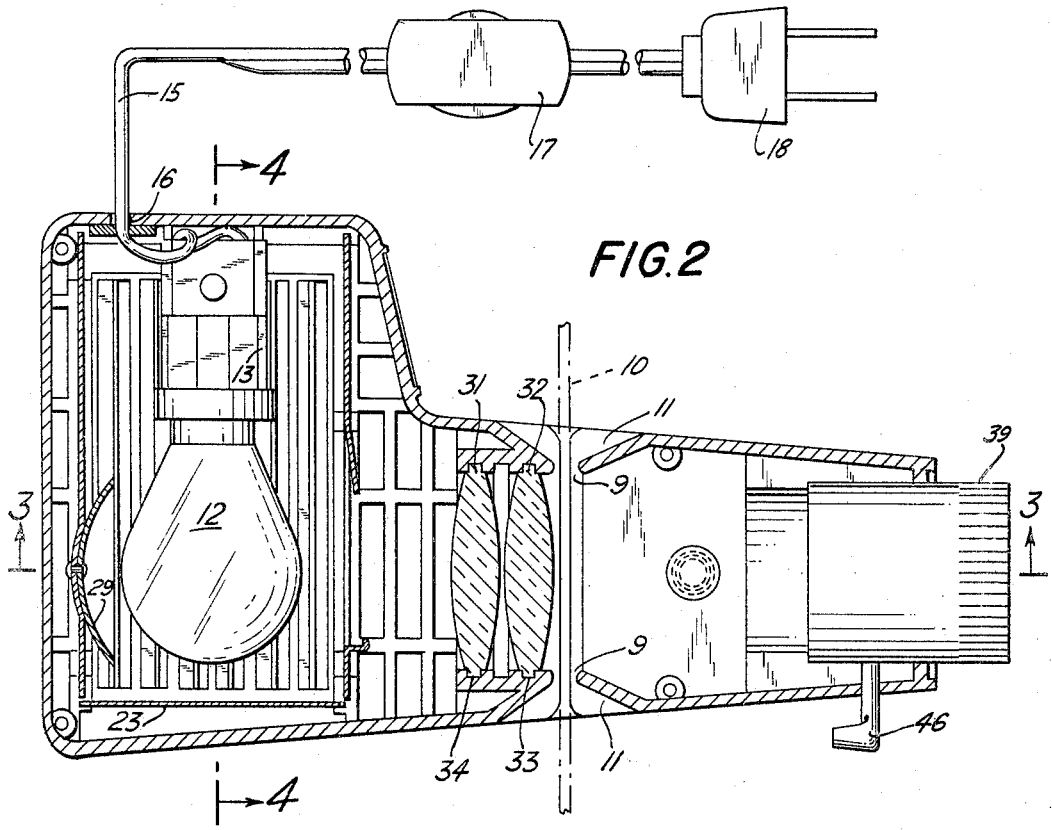
FIG. 2 is a partial cross-sectional elevation view from above of the slide projector illustrated in FIG. 1 along the line 2—2 and also showing an electrical cord, plug and switch.
Figure 3:
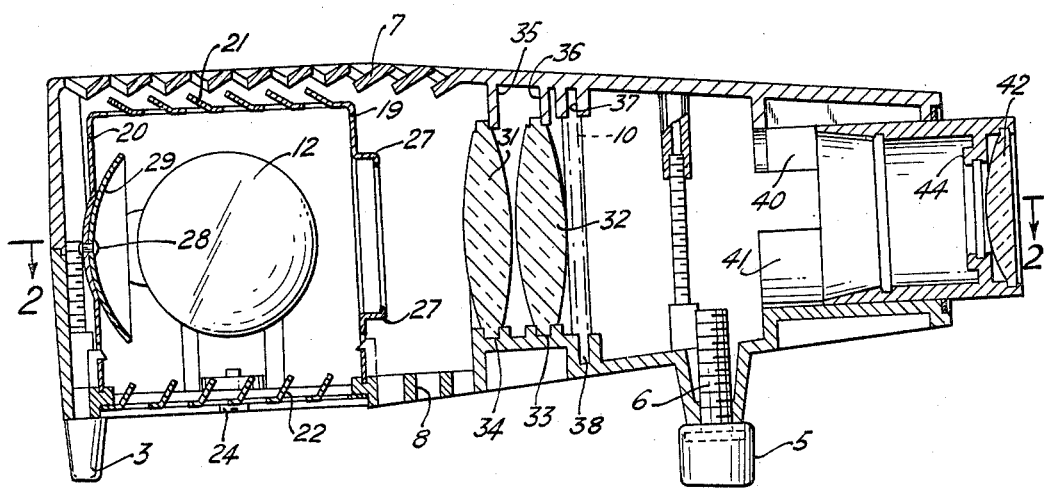
FIG. 3 is a cross-sectional side elevation view of the slide projector illustrated in FIGS. 1 and 2 along the line 3—3.
Figure 4:
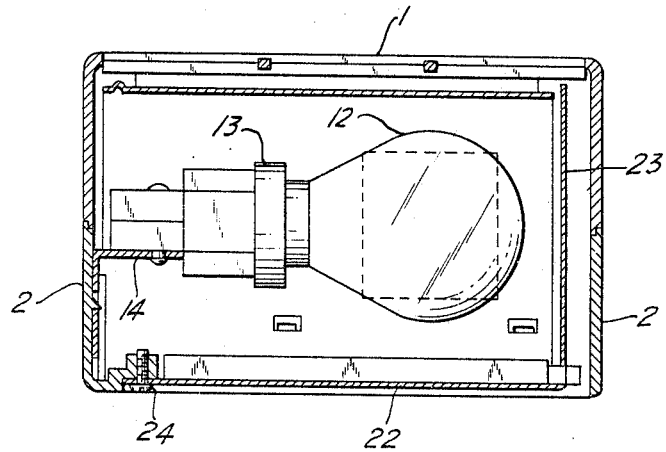
FIG. 4 is a cross-sectional view of the rear of the slide projector illustrated in FIG. 2 along the line 4—4.

Turning more particularly to the projector lamp and heat shielding assembly illustrated in FIGS. 2, 3 and 4, I provide in the rear of the slide projector housing a projector lamp 12 held in a socket 13 suitably secured by L-brace 14 to the inner wall of the housing base 2. An electric cord 15 leads from the socket through a recess 16 along the edge of the housing base adjacent the socket 13. To prevent the electric cord 15 from pulling on the socket, the cord may be suitably knotted on the inside of the recess 16. The electric cord is provided with a manual switch 17 and plug 18. Successful results may be obtained using a bulb of as little as 50-75 watts output.

The projector lamp is enclosed at its front, back, top, bottom and one side by metal plates 19, 20, 21, 22 and 23, respectively. Plates 19, 20 and 21 form a unitary structure permanently secured to the bottom of the housing base adjacent the baffle portions 8 in the base of the housing. Plates 22 and 23 also form a unitary structure removably secured to the bottom of the housing base by screw 24. Plates 21 and 22 covering the top and bottom of the projector lamp, respectively, are baffled to permit vertical ventilation of air heated by the lamp. The baffle 7 in the housing cover overlies the baffle plate 21 so that rising air may escape.

Baffle elements 8 in the housing base, however, terminate adjacent the baffle plate 22. Thus, there is a hole in the bottom of the housing base of dimension commensurate with the dimensions of plate 22. Upon removal of screw 24, the unitary structure comprised of plates 22 and 23 may then also be removed providing more finger clearance and, therefore, access to the projector lamp 12 in the event that it must be replaced.

Adjacent to the projector lamp 12, a hole 25 is provided in plate 19 through which light from the lamp may be projected. About the hole portions of plate 19 projecting tabs 27 form a socket wherein there is securely held a piece of light-transmitting, heat-absorbing glass which forms a heat filter 26. This heat filter impedes the transmission of heat to the lens system and slide film to thereby prevent heat damage.

The inside and outside surfaces of the metal plates 19, 20, 21, 22 and 23 forming the heat shielding which encloses the projector lamp 12 are colored black to promote heat absorption and distribution and thereby prevent concentration of heat in the housing cover and lens system which might result in damage.

Thus, when the projector is being operated and the lamp is lighted, heat generated by the lamp heats the surrounding shield and enclosed air. The air then rises through the baffle in plate 21 and the baffle 7 so that cool air is drawn in through the baffle in plate 22 providing ventilation for the projector lamp.

Adjacent the projector lamp and secured to the rear of plate 20 by rivet 28 is a concave reflector 29. The concave reflector 29 is secured so that it is in alignment with hole 25 in plate 19. Thus, optimum use is made of the light produced by lamp 12 by reflecting it towards the lens system. The inside of concave reflector 29 is provided with a mirror surface of spherical curvature. The radius of curvature depends upon the distance between reflector and filament; and for the dimensions and lens system of the projector illustrated in the diagrams and discussed below, a radius of curvature of approximately one inch would be suitable.

Figure 7:
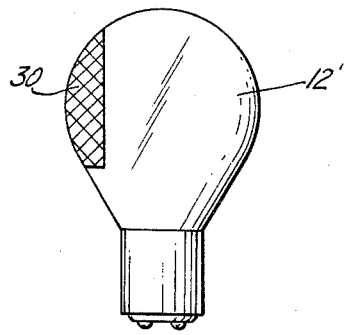
FIG. 7 is an alternative embodiment of my invention in which the reflector consists of a reflective coating on the outer surface of the projector lamp bulb.
Figure 8:
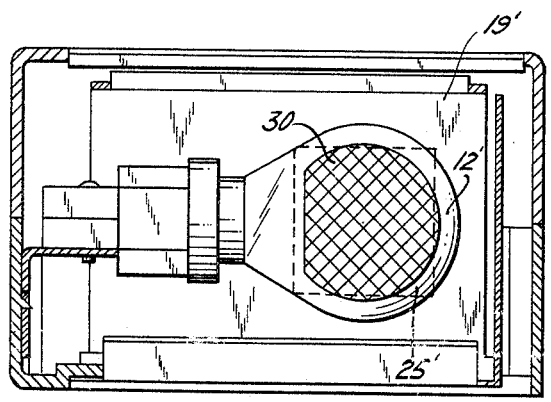
FIG. 8 is a view similar to FIG. 4 illustrating the alternative embodiment of my invention.
Figure 10:
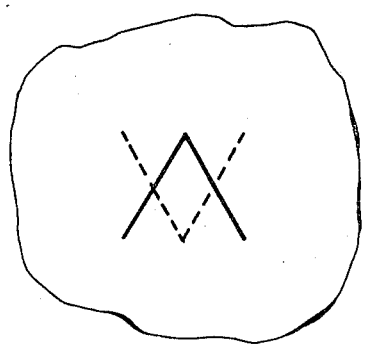
FIG. 10 is a diagrammatic view of the lamp filament and the manner in which its image is reversed upon reflection and superimposed upon itself to double the lamp intensity passing through a mounted slide.

In an alternative embodiment of my invention illustrated in FIGS. 7 and 8, the reflector consists of a reflective coating 30 on the outer surface of the projector lamp 12'. The mirror side of the reflective coating faces the filament, and when the projector lamp 12' is positioned within the slide projector, the filament of the lamp is between the hole 25' in plate 19', and the reflective surface 30 is in alignment with the hole so that light generated by the lamp will be reflected toward the lens system. The lamp 12' is preferably spherical in configuration with its filament being substantially in the center of the sphere. Under these circumstances, the image of the filament is reflected by the mirror coating 30 and superimposed upon itself. This has the effect of doubling the light intensity with the optical system having two inverted V-shaped filaments of the same intensity. This is illustrated schematically in FIG. 10.

Figure 9:
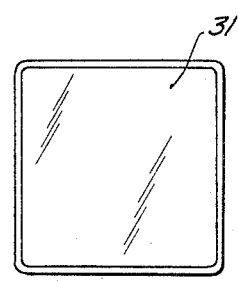
FIG. 9 is a side elevation of one of the condenser lenses.

Turning now to the lens system illustrated in FIGS. 2 and 3, I provide a pair of stationary rectangular condenser lenses 31 and 32 between the hole 25 in the heat shielding in which the projector lamp is enclosed and the slits 9 through which slides are inserted into the projector. The condenser lenses are rectangular in shape as illustrated in FIG. 9 and make optimum use of the space and light available within the forward portion of the compact slide projector. In this connection, a circular condenser lens would require a diameter at least equal to a diagonal of the 35 mm. slide and, therefore, would necessitate a larger housing which would render it difficult, if not impossible, to manually load or grasp a loaded slide for removal. Accordingly, the rectangular condenser lens contributes to the reduced size of the projector. The condenser lenses are bi-convex and in the lens system illustrated in FIGS. 2 and 3 of a successful application, the radius of curvature for each surface was approximately 2.83 inches. The condenser lenses are held tightly in place in the housing base by grooves 33 and 34 formed therein. When the housing cover is placed on the housing base, projections 35 and 36 from the top of the housing cover rest against the condenser lenses and provide further support. Adjacent the forward condenser lens, guide paths 37 and 38 formed in the housing cover and housing base, respectively, provide guide means to support the slides in position before the condenser lenses when they are inserted through the slits 9 formed in the sides of the slide projector housing.

At the forward end of the slide projector housing, the projector lens barrel 39 is movably and rotatably held between the housing cover and the housing base. The projector lens barrel 39 is cylindrical in shape and is seated within the complementary support portions 40 and 41 formed in the housing cover and housing base, respectively. Housed within the projector barrel 39 at the forward end of the barrel is a plano-convex lens 42 positioned with its plane surface forward. Providing a plane surface in the direction of projection minimizes distortion and, in particular, reduces what is known as "barrel distortion" and provides a flatter field.

In the lens system illustrated in FIG. 3 of the mentioned successful application of the invention, the radius of curvature of the plano-convex lens was approximately 1.25 inches.

Figure 5:
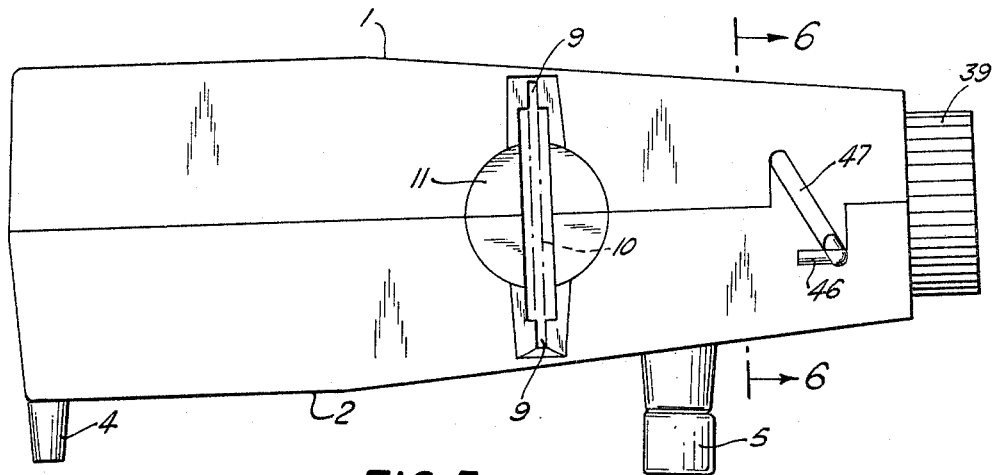
FIG. 5 is a side elevation view of the left slide of the assembled slide projector illustrated in FIG. 1.
Figure 6:
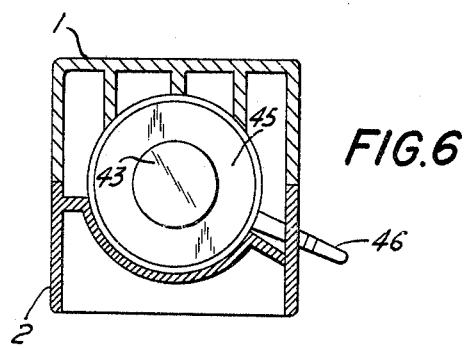
FIG. 6 is a cross-sectional view of the front of the slide projector illustrated in FIG. 5 along the line 6—6.

Integrally formed with the projection lens barrel 39 is a handle 46 which is seated in a diagonal guide slot 47 along the side of the projector housing formed continuously in and between the housing cover and housing base as illustrated in FIG. 5. As the handle 46 is manually adjusted along the slot 47, projection lens barrel 39 rotates and translates forward and backward providing a wide range of focusing for different distances.

Figure 11:
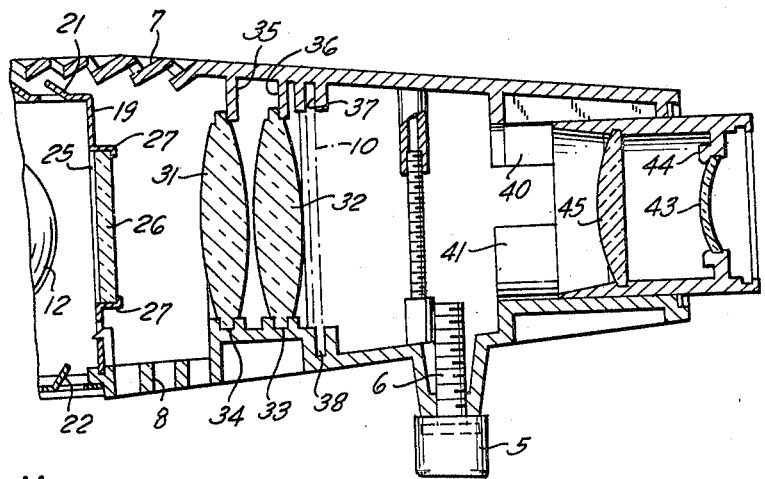
FIG. 11 is an elevational view similar to FIG. 3 showing an alternative embodiment of the invention in which an optional heat filter is employed to protect the lens system and film when high wattage lamps are employed and in which a meniscus lens and rearwardly located plano-convex lens forms part of the optical system where increased image magnification is desired.

In the alternative embodiment of FIG. 11, a light-transmitting heat-absorbing glass heat filter 26 extends across the forward opening or hole 25 and is secured in place by projecting tabs 27. This heat filter impedes the transmission of heat to thereby prevent heat damage to the lens system and slide film, particularly when relatively high wattage lamps are used.

The lens system of the embodiment of FIG. 11 is designed to provide increased image magnification where desired. Thus, a meniscus lens 43 is held in place by annular projection 44 within barrel 39. This lens provides added power and helps to correct distortion. A rearwardly disposed plano-convex lens 42 is mounted within the barrel with its flat surface facing forwardly to complete the system providing increased magnification with minimum distortion.

The slide projector housing base and cover and the lens projector barrel may be molded from a suitable structural plastic such as polypropylene or any high heat-resistant plastic.

The lenses including the two bi-convex condenser lenses may be formed from an acrylic plastic and coated as explained below.

Examples of acrylic resins which may be employed in forming the lenses of the projector lens system are Plexiglas, a trademark of Rohm and Haas, and Lucite, a trademark of Du Pont. Furthermore, a general purpose or high-heat styrene may be used for the condenser lenses as may cellulose acetate. Another material which may be used in forming the lenses is a polycarbonate such as Lexan, a trademark of General Electric.

The lenses and condensers housed in the projection lens barrel are preferably coated with a material which protects the lenses and condensers, acts as an antistatic agent to minimize dust and prevents reflection so that more light is transmitted through the lens rather than reflected. Material of this type is commercially available. In accordance with the above and successful applications of the invention, the lenses in the barrel 39 were merely snapped in place by deploying suitably spaced projection and/or undercuts.

The heat shield enclosing the projector lamp may be made from a metal such as aluminum, and painted black on the inside and outside surface to respectively increase the heat absorbing and emitting capacity of the shield. The reflector may also be made from chrome-plated or tin-plated steel or aluminum polished to yield a mirror surface so that the image of the lamp filament upon itself doubles the output of the lamp or any other comparable reflective surface.

In the form of my invention illustrated in the accompanying diagrams, the overall length of the slide projector housing may be approximately 6 to 7 inches, the width approximately 4 inches, and the height approximately 2½ inches. Thus, the slide projector may be held and operated by hand, or it may be used as a table model when resting on a flat surface on the legs secured to the projector housing base or used on a separate tripod secured to the threaded hole in the housing base after removal of the screw 6 and leg 5. The slide projector may be conveniently used either with single slides or with a slide cartridge with multiple slides mounted therein. Such a slide cartridge is illustrated in phantom in the accompanying diagrams and in particular, FIG. 1, and forms the subject matter disclosed in my above mentioned companion patent application.

Although a single somewhat preferred embodiment of this invention has been disclosed and described in detail herein, it should be understood that this invention is in no sense limited thereby and its scope is to be taken by that of the appended claims.

I claim:

1. A new and improved slide projector comprising: a housing comprising a housing cover baffled at the rear top portion thereof and a housing base baffled at the rear bottom portion thereof to facilitate ventilation of the housing, a lamp and socket positioned in the rear portion of the housing, said housing base having a hole in the rear bottom portion thereof to allow removal and replacement of the lamp therethrough, said housing being tapered at its forward portion to accommodate a projector lens system, said housing also having juxtaposed slits in the opposite sides of the tapered portion through which slides may be fed into the path of the lens system; a heat-absorbing heat-dissipating ventilating shield enclosing the lamp in the rear portion of the housing and having a light-transmitting opening in the forward portion of said shield through which light generated by the lamp may be directed; a reflector secured to the inside rear of the shield in line with the lamp and opening for directing light generated by the lamp through the opening; a lens system comprising at least one rectangular condenser lens between the light-transmitting opening in the heat shield enclosing the lamp and the housing slits through which slides are fed to make optimum use of light from the lamp, and a projector lens assembly movably held in the front of the housing, a plano-convex lens mounted at the forward end of the movable assembly with its plane face forward, said assembly also having a manually operated means coupled to the lens assembly for moving the assembly to provide variable magnification.

2. A new and improved slide projector as set forth in claim 1 wherein said heat-absorbing heat-dissipating ventilating shield inclosing the lamp comprises: a first metal enclosure secured to the housing base and enclosing the front, back and top of the lamp wherein said top portion is baffled; a second metal enclosure removably secured to the housing base and enclosing the bottom and one side of the lamp to form a five sided enclosure with said first metal enclosure wherein said bottom portion is baffled and of dimensions commensurate with the hole in the rear bottom of the housing base whereby the lamp bulb is removable and replaceable when the bottom and side portion of the shield is removed.

3. A new and improved slide projector as set forth in claim 2 further provides that the inside and outside of the metal shield is colored black to increase heat absorption and emittance and prevent concentration of heat.

4. A new and improved slide projector as set forth in claim 1 wherein the lens system comprises a pair of bi-convex rectangular condenser lenses interposed between the light-transmitting opening in the heat shield and the housing slits through which slides are fed, and a projector lens assembly comprising a projector lens assembly barrel rotatably and translationally held between the housing cover and housing base in the front of the housing, said barrel retaining a meniscus lens to increase power and reduce distortion and a plano-convex lens behind the meniscus lens with its plane surface forward to further control the optical properties of the lens system, said barrel having integrally formed therewith a manually operated cam follower seated in a diagonal cam formed continuously between the housing cover and base in the front of said housing whereby the projector lens assembly is rotated and translated by manual operation of the cam follower.

5. A new and improved slide projector as set forth in claim 4 wherein the lenses comprising the lens system are formed of an acrylic resin.

(References on following page)

References Cited

UNITED STATES PATENTS

| | | | |
|---|---|---|---|
| 1,818,355 | 8/1931 | Readeker | 352—244 |
| 2,050,224 | 8/1936 | Gilmore | 353—95 X |
| 2,141,317 | 12/1938 | Sabel | 350—189 |
| 2,161,368 | 6/1939 | McLeod | 350—190 |
| 2,238,008 | 4/1941 | Beck et al. | 353—38 |
| 2,365,504 | 12/1944 | Adler | 240—46.49 X |
| 2,369,248 | 2/1945 | Pratt | 353—56 |
| 2,477,107 | 7/1949 | Wolfe | 353—101 |
| 2,586,436 | 2/1952 | Planer | 353—102 |
| 3,253,504 | 5/1966 | Vollmer | 353—56 X |
| 3,295,407 | 1/1967 | Jeffree | 350—189 X |

NORTON ANSHER, Primary Examiner

R. M. SHEER, Assistant Examiner

U.S. Cl. X.R.

350—189, 190; 353—56, 101, 102, 103